United States Patent
Garza et al.

(10) Patent No.: US 10,501,330 B1
(45) Date of Patent: Dec. 10, 2019

(54) METHOD OF PREPARING ALUMINUM SULFATE

(71) Applicant: Chameleon Industries, Inc., Mesquite, TX (US)

(72) Inventors: Faustino Ignacio Garza, Mesquite, TX (US); Jared Wayne Garza, Mesquite, TX (US); Jason Lamar Garza, Mesquite, TX (US)

(73) Assignee: Chameleon Industries, Inc., Mesquite, TX (US)

( * ) Notice: Subject to any disclaimer, the term of this patent is extended or adjusted under 35 U.S.C. 154(b) by 0 days.

(21) Appl. No.: 16/035,189

(22) Filed: Jul. 13, 2018

(51) Int. Cl.
*C01F 7/74* (2006.01)

(52) U.S. Cl.
CPC .............. *C01F 7/743* (2013.01); *C01F 7/74* (2013.01)

(58) Field of Classification Search
CPC ............. C01F 7/74; C01F 7/743; C01F 7/745
See application file for complete search history.

(56) References Cited

U.S. PATENT DOCUMENTS

| | | | |
|---|---|---|---|
| 5,356,602 A | 10/1994 | Tanjo | |
| 5,942,199 A * | 8/1999 | Jokinen | C01F 7/74 423/122 |
| 7,067,099 B2 | 6/2006 | Inagaki | |
| 7,360,550 B2 | 4/2008 | Inagaki | |

* cited by examiner

*Primary Examiner* — Timothy C Vanoy
(74) *Attorney, Agent, or Firm* — Celina M. Orr; Braxton Perrone, PLLC

(57) ABSTRACT

A method of processing a non-virgin sulfuric acid solution for the preparation of aluminum sulfate comprises the steps of combining a sulfuric acid solution having less than 90% sulfuric acid with water to form a mixed solution of no less than about 10% sulfuric acid. An alumina-containing compound such as aluminum hydroxide or aluminum bauxite is then added, the combination forming a pH of 2.0 or less. Once a specific gravity of less than about 1.36 is reached, the aluminum sulfate cools and settles overnight before filtering and/or storing.

18 Claims, 3 Drawing Sheets

US 10,501,330 B1

METHOD OF PREPARING ALUMINUM SULFATE

BACKGROUND OF THE INVENTION

Technical Field

The present invention relates generally to methods of preparing aluminum sulfate; and more specifically, to methods of preparing aluminum sulfate using sulfuric acid.

History of Related Art

Sulfuric acid is a basic raw material used in a wide variety of manufacturing processes and industries including, for example, the production of phosphate fertilizers, paper, inorganic pigment, and industrial organic chemicals. In the production of liquid aluminum sulfate, virgin or highly concentrated sulfuric acid (i.e., 93-98%) is typically first reacted with aluminum hydroxide and heated prior to dilution with water and cooling steps to obtain liquid aluminum sulfate.

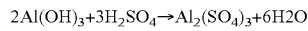

The use of sulfuric acid solutions other than virgin sulfuric acid in the above method provides for incorporation of only small amounts (≤10%) of sulfuric acid solutions having concentrations less than 93%.

SUMMARY

There is a need for a method that provides for use of a substantial amount of a sulfuric acid solution other than virgin sulfuric acid for the production of aluminum sulfate.

Below is a simplified summary of this disclosure meant to provide a basic understanding of the method(s) described herein. This is not an exhaustive overview and is not intended to identify key or critical elements or to delineate the scope of the description. Its sole purpose is to present some concepts in a simplified form as a prelude to the more detailed description below.

In one aspect, the present disclosure relates to a method of processing a sulfuric acid solution in the preparation of liquid aluminum sulfate, the method comprising the steps of combining water with a sulfuric acid solution comprising no more than 90% sulfuric acid; mixing the water and the sulfuric acid solution to form a mixed solution comprising a concentration of sulfuric acid of between about 10% and about 50%; and adding an alumina-containing compound to the mixed solution to form aluminum sulfate.

At least one of the mixing step or the adding step comprises a temperature of at least about 175° F. In some embodiments, for formation of the aluminum sulfate, the temperature comprises a temperature of less than about 225° F. In any of the above embodiments, the alumina-containing compound comprises aluminum hydroxide or aluminum bauxite.

In any of the above embodiments, the method may further comprise a step of monitoring and/or maintaining a pH of the heated solution within a range of between about 1.6 and about 2.0. In any of the above embodiments, the method comprises a step of adding water to the aluminum sulfate to obtain a specific gravity of less than about 1.36. In any of the above embodiments, the method comprises cooling the aluminum sulfate comprising a specific gravity of less than about 1.36. In any of the above embodiments, the method may further comprise a step of filtering the aluminum sulfate. In any of the above embodiments, the method comprises the step of storing the aluminum sulfate for later use.

Other aspects, embodiments, and features of this disclosure will become apparent in the following written description and accompanying drawings.

BRIEF DESCRIPTION OF THE DRAWINGS

The novel features believed characteristic of the invention are set forth in the appended claims. The invention itself, however, as well as further objectives and advantages thereof, will be best understood by reference to the following detailed description of illustrative embodiments when read in conjunction with the accompanying drawings, wherein:

FIG. 2B depicts a side view of the embodiment shown in FIG. 2a.

FIG. 2C depicts a top view of the embodiment shown in FIG. 2a.

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
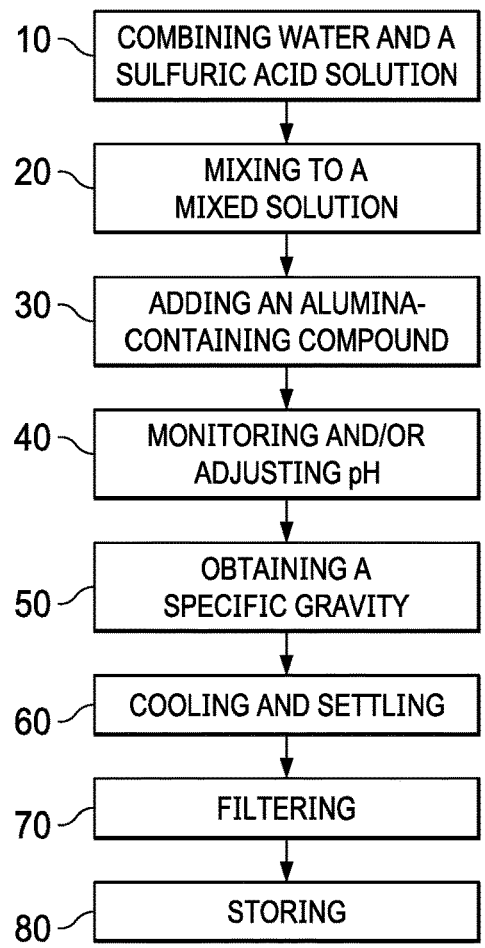
FIG. 1 is a flowchart of one embodiment of the method described herein.

FIG. 1 is a perspective view of one embodiment of a method described herein for processing a sulfuric acid solution for the preparation of liquid aluminum sulfate. Water and a sulfuric acid solution are first combined 10 in a mixing device. Water, as used herein and described throughout this method, generally refers to pure, deionized and/or tap water, whether hard water or soft water. In some embodiments, the water may comprise room or ambient temperatures of between about 60-75° F., for example. However, water outside these temperatures may also be used. In some embodiments, suitable water is potable. The sulfuric acid solution combined with water is a non-virgin sulfuric acid solution; that is, a sulfuric acid solution comprising no more than 90% sulfuric acid. In some embodiments, prior the combining step 10, the sulfuric acid solution comprises no more than about 80% sulfuric acid. In some embodiments, prior the combining step 10, the sulfuric acid solution comprises no more than about 75% sulfuric acid. In some embodiments, the sulfuric acid solution comprises no more than about 65% sulfuric acid. In some embodiments, the sulfuric acid solution comprises no more than about 60% sulfuric acid. In some embodiments, the sulfuric acid solution comprises between about 60% and about 75% sulfuric acid. In some embodiments, the sulfuric acid solution comprises between about 65% and about 70% sulfuric acid. In some embodiments, the sulfuric acid solution comprises between about 60% and about 70% sulfuric acid.

Generally, the sulfuric acid solution to be combined with the water in the combining step 10 comprises sulfuric acid and water. In certain embodiments, prior to the combining step 10, the sulfuric acid solution also comprises hydrogen peroxide. Hydrogen peroxide may be present in an amount up to about 20% by weight of the sulfuric acid solution prior to the combining step 10. In some embodiments, the sulfuric acid solution comprises at least 0.1% to about 6% hydrogen peroxide. In some embodiments, the sulfuric acid solution comprises at least 0.5% to about 6% hydrogen peroxide. In some embodiments, the sulfuric acid solution comprises at least 1.0% to about 6% hydrogen peroxide. In some embodiments, the sulfuric acid solution comprises between about 2% to about 4% hydrogen peroxide. In some embodiments, the sulfuric acid solution comprises between about 3% to about 4% hydrogen peroxide. In some embodiments, the sulfuric acid solution consists of sulfuric acid, hydrogen peroxide, and water. Thus, in certain embodiments, the sulfuric acid solution to be combined in the step 10 is free of metal. In all embodiments described herein, the aluminum sulfate produced using the method described herein is free of nitric acid, and all components and steps are free of nitric acid. In some embodiments, the sulfuric acid solution comprises between about 10% to about 50% water. In some embodiments, the sulfuric acid solution comprises between about 15% to about 45% water. In certain embodiments, the sulfuric acid solution comprises between about 19% to about 38% water. Suitable sulfuric acid solutions for the combining step 10 may be prepared or obtained, for example, as sulfuric acid waste from any number of industrial processes.

Returning to the discussion of FIG. 1, in certain embodiments, the combining step 10 comprises simultaneous adding of the sulfuric acid solution and the water into a single mixing device, an embodiment of which will be further described below. In other embodiments, the combining step may be performed by sequentially adding water and then the sulfuric acid solution. In such embodiments, the combining step may further comprise alternately or intermittently adding water and the sulfuric acid solution any number of times after adding a portion of the sulfuric acid solution to the water.

Following the combining step 10, the method comprises the step of mixing 20 the water and the sulfuric acid solution to form a mixed solution comprising a concentration of sulfuric acid of between about 10% and about 50%. In certain embodiments, the mixed solution comprises a concentration of sulfuric acid of between about 10% and about 35%. In some embodiments, the mixed solution comprises a concentration of sulfuric acid of between about 15% and about 25%.

In attaining the proper concentration of sulfuric acid in the mixed solution, the mixing step 20 may further comprise a step of adding at least one of: virgin sulfuric acid and water as the mix is being stirred by the agitator blades. The term "virgin sulfuric acid," as used herein, is meant to refer to a sulfuric acid solution comprising a concentration of sulfuric acid of 90% or more. Adding virgin sulfuric acid helps increase the temperature of the mixed solution to about 175° F. in some embodiments, which may speed promotion of the reaction. Such additions may take place simultaneously or sequentially in no particular order. In some embodiments, the sulfuric acid solution may be combined with a virgin sulfuric acid prior to the combining step 10. In certain embodiments, a ratio of about 50:50 virgin and non-virgin sulfuric acid, for example, may be combined with and mixed with the water. However, other embodiments of the sulfuric acid solution and the mixed solution are free of virgin sulfuric acid and comprise 100% of the non-virgin sulfuric acid solution described above.

In certain embodiments, the combining step 10 and the mixing step 20 may be performed sequentially. In some embodiments, the combining step 10 and the mixing step 20 may be performed simultaneously. Some embodiments may also comprise intermittent mixing steps to form the mixed solution. The combining 10 and/or mixing 20 steps may take place for time period of over 20 to about 60 minutes, depending on the initial sulfuric acid concentration of the solution prior to combining 10. Mixing 20 should be performed at a speed of between at least about 25 rpm and no more than about 31 rpm. Speeds less than 25 rpm result in inadequate mixing with too much settling on the bottom. Above 31 rpm, undesirable waves will result in the mixing vessel. In some embodiments, the mixing step is performed at between about 26 rpm to about 30 rpm. In some embodiments, the mixing step is performed at between about 28 rpm to about 29 rpm. In some embodiments, the mixing step 20 is performed continuously throughout the combining 10, mixing 20, and adding steps.

Figure 2A:
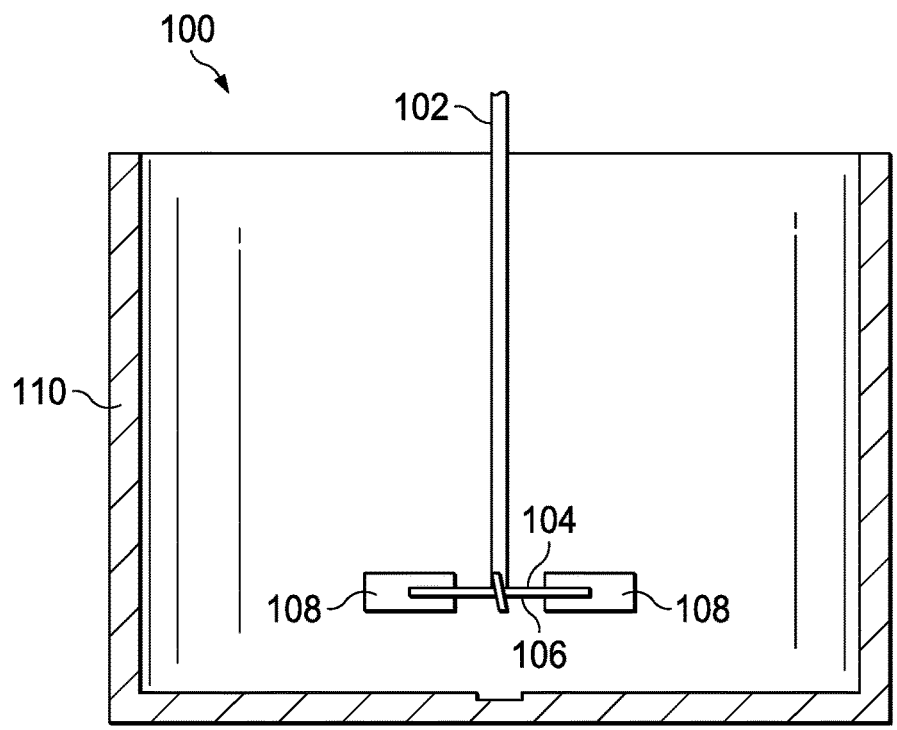
FIG. 2A depicts one embodiment of a mixing device and agitator blade used for mixing.
Figure 2B:
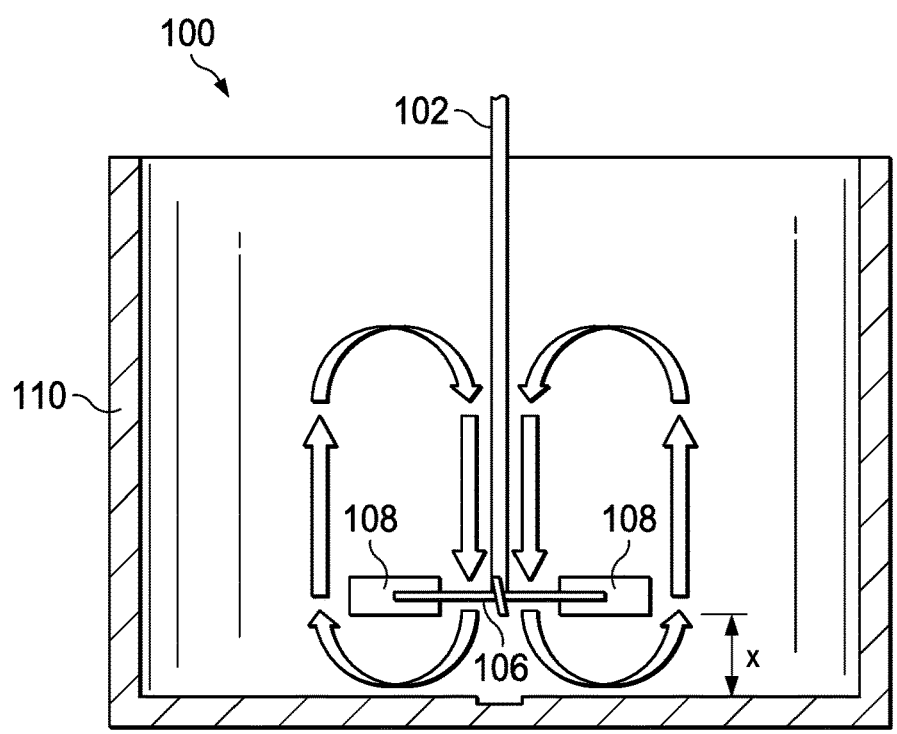
Figure 2C:
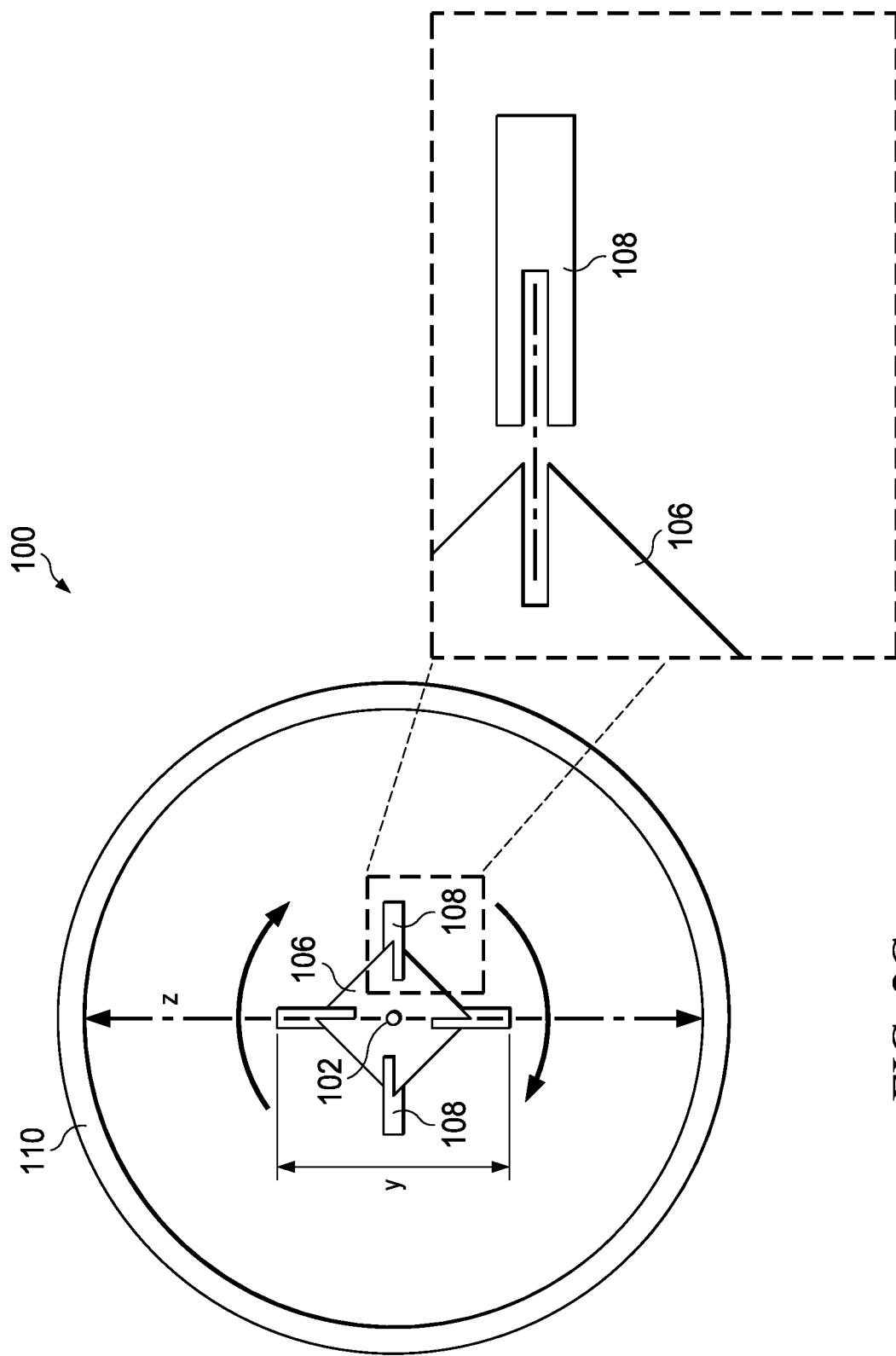

FIGS. 2A-2C illustrate one embodiment of a suitable mixing device 100. FIG. 2A is a cross-section view of a tank 110 of the mixing device 100 comprising a rotating shaft 102 within the tank 110, the rotating shaft 102 comprising an impeller 104 on an end near the bottom of the tank 110. The impeller comprises a plate 106 and a plurality of agitator blades 108 extending from the plate 106. For clarity, FIG. 2A depicts only two of the four blades 108 of the embodiment shown therein. The plate 106 is connected or mounted perpendicular to the rotating shaft 102. The plate may comprise a hole in its center for the shaft. The shaft 102 may comprise, for example, a diameter of about 2.25 to about 2.5 inches. By way of example, the plate may comprise a square shape with each side about 2 feet long and about 2 feet wide. Other shapes may be possible so long as an axial flow of the component(s) within the mixing vessel is accomplished during mixing.

In some embodiments, the impeller comprises an even number of agitator blades 108. In certain embodiments, the blades are mounted at an angle extending from an upper left to a lower right. The blades 108 may be mounted at an angle of between about 10° to about 80° with respect to the horizontal axis of the plate 106. In some embodiments, the blades 108 are mounted at an angle of between about 20° to about 70°. In some embodiments, the blades 108 are mounted at an angle of between about 30° to about 60°. In some embodiments, an even number of blades 108 are mounted at an angle of about 45° from the upper left to the lower right.

In some embodiments, each corner of the plate 106 may comprise a slot or slit for each blade 108, the slot comprising a length sufficient to engage with a corresponding slot of a blade 108, as best shown in FIG. 2c. Each blade 108 may be inserted and welded into a slot at a corner of the plate 106 via a corresponding slot in the blade 108, the corresponding slot of the blade 108 located midway between one end of a width of the blade. While FIG. 2C shows the slots fully extending out to a perimeter of each of the plate and the blade, other fits may be possible so long as the plate and connected blades form a solid bond.

The distance x from the bottom of the tank 110 to the blades 108 of the impeller is from about 0.5 times the diameter y of the impeller to about 2.0 times the impeller diameter y. In some embodiments, the distance x ranges from about 0.67 to 1.3 times the diameter of the impeller. As shown in the embodiment depicted in FIGS. 2A-2C, four flat rectangular blades 108 are attached to the square plate 106. In some embodiments, each blade 108 comprises an aspect ratio ranging from about 4:3 to about 2:1. For example, when a blade 108 comprises a width of about ten inches and a length of about 20 inches, a corresponding slot on the blade 108 is located on the center of the width of the blade, with about 5 inches on either side of the corresponding slot on the blade. The diameter y of the impeller 104 is about 0.25 to about 0.5 times the inner diameter z of the tank 110. In some embodiments, the diameter y of the impeller is about ⅓ of the inner diameter z of the tank 110. The mixing step thus described herein creates an axial flow pattern between the liquids, which pulls fluid from the top center of the tank and down along the shaft 102 towards the center bottom of the tank, as shown in FIG. 2B. The fluid then flows along the bottom toward and then up the outside walls. This keeps the corrosive acid from collecting at the top or coming in direct contact with the walls of the tank, while promoting the formation of aluminum sulfate, as described below. As shown in FIG. 2C, the fluid rotates in a clockwise direction in some embodiments.

Returning to the discussion of FIG. 1, once a mixed solution is formed within the recited range of sulfuric acid concentration, an alumina-containing compound is added 30 to the mixing device, initiating the formation of aluminum sulfate. Suitable alumina-containing compound may comprise aluminum hydroxide and aluminum bauxite. In some embodiments, the alumina-containing compound comprises aluminum hydroxide. In some embodiments, the alumina-containing compound consists of aluminum hydroxide. In some embodiments, the alumina-containing compound comprises aluminum bauxite. In some embodiments, the alumina-containing compound consists of aluminum bauxite. Generally, the adding step 30 is performed in a controlled manner over a period of time sufficient to allow the mixed solution to reach a temperature of at least about 175° F., at which point the alumina-containing compound and the mixed solution begin to react to form aluminum sulfate. In some embodiments, the heated solution reaches a temperature of between about 175° F. and about 225° F. In some embodiments, the heated solution reaches a temperature of at least about 200° F. In some embodiments, the heated solution reaches a temperature of between about 200° F. and about 220° F. In some embodiments, the heated solution reaches a temperature of between about 200° F. and about 210° F. In some embodiments, the adding step 30 is performed for at least about 2 hours at a feeding rate of between about 150 to about 250 lbs/minute. In some embodiments, the adding step 30 comprises a rate of between about 160 and about 220 lbs/minute. In some embodiments, the adding step 30 comprises a rate of between about 170 and about 200 lbs/minute. In some embodiments, the adding step is performed for between about 2 hours to about 3 hours. Adding 30 may comprise continuous feeding in some embodiments. In other embodiments, adding 30 may comprise intermittent feeding of the alumina-containing compound to the mixing device or vessel. A combination of continuous and intermittent feeding is also possible in some embodiments.

During the adding step 30, mixing step 20 should continue to be performed, whether simultaneous or intermittently at speeds as recited above. When the mixing speed is too high, heat transfer rates may increase along the walls, overcooling the solution and preventing it from achieving necessary temperatures for the reaction. Similarly, when speed is too low, the temperatures are too low, and the desired reaction is not promoted. In some embodiments, after adding 30, the method may comprise adding virgin sulfuric acid to increase or maintain the temperature to at least about 175° F. Water can also be added in some embodiments to cool the temperature to below about 225° F.

The adding step 30 may partially overlap the combining 10 and/or mixing steps 20 in some embodiments. Once all the alumina-containing compound has been added 30, the heated solution is then allowed to react over a time period of at least about 2 hours. During this period, the method further comprises a step of monitoring and maintaining a pH of the heated solution 40 to ensure a complete reaction between the sulfuric acid and the alumina-containing compound. The heated solution should comprise a pH of between about 1.6 and about 2.0 at this time. Thus, if necessary, the method may comprise a step of adjusting the pH. Adjusting pH may be performed by adding additional non-virgin sulfuric acid solution if the pH is too high. If the pH is low, more alumina-containing compound should be added. The specific gravity of the aluminum sulfate is generally about 1.38 after the monitoring step 40. In some embodiments, the monitoring step 40 is performed for less than about 4 hours. In some embodiments, the monitoring step 40 is performed for between about 2 hours and about 4 hours.

Once the pH is confirmed to be within the correct range, the method comprises the step of obtaining a specific gravity 50 of less than about 1.4. This step 50 can be performed by adding water to the aluminum sulfate to obtain the desired specific gravity. In some embodiments, water is added to obtain a specific gravity of between about 1.3 to about 1.38. In some embodiments, water is added to obtain a specific gravity of between about 1.34 to about 1.36.

Once the proper specific gravity is attained, the aluminum sulfate is cooled 60. Cooling 60 may take place overnight, or for at least about 10 hours in some embodiments. In some embodiments, a cooling system may be used such as one including one or more of a cooling jacket, cooling liquid, or cooling air. Cooling 60 also allows the settling of the reacted solution. Cooling and settling may be performed overnight. In some embodiments, the cooling and setting steps may be performed for at least about 10 hours. In some embodiments, the cooling and setting steps may be performed for at least about 15 hours. After the cooling period 60, the aluminum sulfate is subjected to filtering 70 and may then be stored 80 if desired. During filtering 70, the aluminum sulfate comprises the following physical properties at about 160° F. to about 180° F.:

| | |
|---|---|
| Dry Alum in Solution: | 48-49% |
| $Al_2O_3$ | 8.0-8.4% |
| Free $Al_2O_3$ | +/− 0.025% |
| Total Iron as $Fe_2O_3$ | <50 ppm |
| Insoluble Matter | <0.02% |
| Specific Gravity | 1.325 +/− 0.003 |
| pH | 1.8-2.5 |

It should be noted that embodiments comprising or consisting of aluminum bauxite may comprise additional processing steps to minimize the amount of residual solids leftover after the reaction takes place. By way of example and without limitation, in such embodiments, the method may comprise at least one round of additional settling of the reaction, pumping out aluminum sulfate, and the adding of water to recover leftover aluminum sulfate before any discarding of unrecoverable waste.

While current methods of producing aluminum sulfate, which first react highly concentrated sulfuric acid with aluminum hydroxide, result in faster manufacturing times, it is believed that the method and system described herein is less volatile and less sensitive to the presence of a weaker sulfuric acid solution. Thus, the process is more forgiving and allows substantially all the sulfuric acid solution to be sourced from a non-virgin sulfuric acid as described herein. The method described herein is also not as aggressive as methods using only or substantially only virgin sulfuric acid, as the temperatures of the reactions described herein increase slowly and are easily maintained at the proper temperatures for the reaction to fully occur, leaving little residual solids to clean up. The method and system described herein is therefore also safer than currently used methods and provides for a simplified, cost effective way of making aluminum sulfate. It should be noted that the method described herein is free of any additional or external heating devices or systems including, by way of example, steam. Instead, the current method relies entirely upon exothermic reactions and promoting the sulfuric acid and the alumina-containing compound to fully react in forming the aluminum sulfate. In some embodiments, the present method leaves substantially no (i.e., less than 1%) residual solids in the mixing vessel following the reaction.

Figure 3:
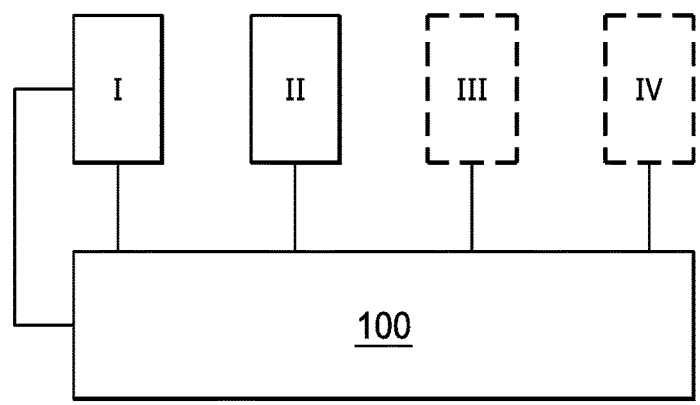
FIG. 3 depicts one embodiment of a system described herein.

FIG. 3 depicts a system of making aluminum sulfate. The system of making aluminum sulfate described herein comprises at least a first tank I and a second tank II in communication with a single mixing device or vessel 100. At least one of the first tank and the second tank is in communication with both a top half of the mixing device and a bottom half of the mixing device. By way of example, FIG. 3 depicts the first tank I in communication with both the top and bottom halves of the mixing device 100. The first tank I may consist of, for example, the water, while the second tank II may consist of the non-virgin sulfuric acid, described above. Any number of transportation systems used for fluids such as one or more pipes and one or more pumps may be used to allow that each tank be in communication with the mixing device 100. As described above in relation to FIGS. 2A-2C, the mixing device 100 comprises an inner diameter and a hollow opening having a rotatable shaft within the hollow opening. The rotatable shaft extends into the hollow opening and comprises an impeller near a bottom wall of the mixing device 100. Further details of the mixing device and its impeller are described above in relation to FIGS. 2A-2C.

In some embodiments, the system further comprises a third tank III in communication with the single mixing vessel 100. In additional embodiments, the system further comprises a fourth tank IV. Tanks III and IV are shown in dashed lines in FIG. 3. The third tank III may comprise, for example, virgin sulfuric acid for mixing to the desired concentration and/or for ensuring complete formation of aluminum sulfate after the adding step. Alternatively, the third tank III may comprise the alumina-containing compound to allow for the adding or feeding of the alumina-containing compound to the mixed solution within the mixing device 100. In some embodiments, a fourth tank IV may be in communication with the mixing device 100. The fourth tank IV may comprise, for example, the alumina-containing compound when virgin sulfuric acid is desired for use with the system. Similar to the first and second tanks, either of the third or fourth tank having an additional liquid, may communicate with the mixing device 100 via a pipe or pumping system suitable for use with liquid. The tank III or IV, when comprising the alumina-containing compound, is in communication with the mixing device 100 via any number of transporting systems suitable for powder materials, including without limitation a conveyor belt, a screw auger, or a pneumatic pumping system.

The mixing device 100 comprises a rotatable shaft, an example of which is described above and shown in FIGS. 2A-2C, provides for mixing of the components added to the mixing device 100. The rotatable shaft is further in communication with a motor to control mixing speed of the mixing device.

In some embodiments, components of one or more of the first tank, second tank, third tank, and fourth tank may be fed directly into or near the top of the mixing device 100. In addition, at least one tank is in communication with or near a bottom half of the mixing device 100. In certain embodiments, any of the tanks I-IV comprising water may also be fed into or near the bottom of the mixing device 100. As shown by way of example in FIG. 3, tank I is in communication with both the top half and the bottom half of the mixing vessel. In this manner, as described above, tank I may comprise water, which may be added to the mixing device in forming the mixed solution, or to the adding step of the method to help adjust the temperature of the heated solution in forming the aluminum sulfate. The mixing device 100 described in detail in relation to FIGS. 2A-2C, may further be in communication with a filter. As described above, the system of the present disclosure may be free of any heating devices.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. The terms "including," "comprising," "having," and variations thereof mean "including but not limited to," unless expressly specified otherwise. When used in the appended claims, in original and amended form, the term "comprising" is intended to be inclusive or open-ended and does not exclude any additional, unrecited element, method, step or material. The term "consisting of" excludes any element, step or material other than those specified in the claim. As used herein, "up to" includes zero, meaning no amount (i.e, 0%) is added in some embodiments.

Unless otherwise specified, all percentages, parts and ratios refer to percentage, part, or ratio by weight of the total. Unless specifically set forth herein, the terms "a", "an", and "the" are not limited to one of such elements, but instead mean "at least one," unless otherwise specified. The term "about" as used herein refers to the precise values as subsequently indicated as well as to values that are within statistical variations or measuring inaccuracies.

The methods disclosed herein may be suitably practiced in the absence of any element, limitation, or step that is not specifically disclosed herein. Similarly, specific devices described herein may be free of any component not specifically described herein. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. For example, the range 1 to 10 also incorporates reference to all rational numbers within that range (i.e., 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

While the invention has been particularly shown and described with reference to certain embodiments, it will be understood by those skilled in the art that various changes in form and detail may be made therein without departing from the spirit and scope of the invention.

What is claimed is:

1. A method of preparing liquid aluminum sulfate, the method comprising the steps of:
    combining water with a sulfuric acid solution comprising no more than 90% sulfuric acid;
    mixing the water and the sulfuric acid solution to form a mixed solution comprising a concentration of sulfuric acid of between about 10% and about 50%; and
    adding an alumina-containing compound to the mixed solution to form aluminum sulfate.

2. The method of claim 1 wherein the mixing step comprises a temperature of at least about 175° F.

3. The method of claim 1 wherein the adding step comprises a temperature of at least about 175° F.

4. The method of claim 1 wherein the alumina-containing compound comprises one of aluminum hydroxide and aluminum bauxite.

5. The method of claim 1 further comprising a step of monitoring the pH of the heated solution and optionally adjusting the pH to between about 1.6 and about 2.0 to ensure the mixed solution and the alumina-containing compound fully react.

6. The method of claim 5 wherein the monitoring is performed for at least 2 hours.

7. The method of claim 5 further comprising the steps of:
    adding water to the aluminum sulfate to obtain a specific gravity of less than about 1.36; and
    allowing the aluminum sulfate to cool and settle for at least about 10 hours.

8. The method of claim 1 further comprising the step of filtering the aluminum sulfate after cooling.

9. The method of claim 1 wherein the sulfuric acid solution comprises no more than about 75% sulfuric acid prior to the combining step.

10. The method of claim 1 wherein the sulfuric acid solution comprises no more than about 50% sulfuric acid prior to the combining step.

11. The method of claim 1 wherein the sulfuric acid solution consists of sulfuric acid, hydrogen peroxide and water prior to the combining step.

12. The method of claim 1 wherein the combining step comprises sequentially adding the water and the sulfuric acid.

13. The method of claim 1 wherein the combining step comprising simultaneously adding the water and the sulfuric acid.

14. The method of claim 1 wherein the combining and mixing steps are performed simultaneously.

15. The method of claim 1 wherein the mixing step is performed at between at least about 25 rpm and no more than about 31 rpm.

16. The method of claim 1 wherein the mixing step comprises a step of adding at least one of virgin sulfuric acid and water to form the mixed solution to said concentration of sulfuric acid.

17. The method of claim 1 wherein the mixing step is performing continuously throughout the combining, mixing, and adding steps.

18. The method of claim 1 wherein the adding step is performed for at least about 2 hours at a feeding rate of between about 150 to about 250 lbs/minute.

* * * * *